United States Patent [19]
Klein

[11] 3,857,645
[45] Dec. 31, 1974

[54] LEADER WITH A LINE CONNECTOR

[76] Inventor: Gerald B. Klein, 13451 Stuart Ct., Broomfield, Colo. 80020

[22] Filed: July 24, 1972

[21] Appl. No.: 274,307

Related U.S. Application Data

[63] Continuation-in-part of Ser. No. 128,015, March 25, 1971, Pat. No. 3,717,907.

[52] U.S. Cl.................. 403/206, 24/129, 43/44.9, 289/1.5, 403/215
[51] Int. Cl. ...................... F16g 11/00, F16g 11/02
[58] Field of Search .... 24/123 R, 123 B, 28, 128 R, 24/129 R; 43/44.83, 44.89, 44.9; 287/80, 113; 289/1.5; 403/206, 215

[56] References Cited
UNITED STATES PATENTS

| 270,478 | 1/1883 | Pumphrey | 24/28 |
|---|---|---|---|
| 575,641 | 1/1897 | Gerard et al. | 24/123 R |
| 663,605 | 12/1900 | Frankham | 24/128 R |
| 849,832 | 4/1907 | Collins | 24/129 R |
| 1,466,495 | 8/1923 | Watson | 24/129 R |
| 2,674,824 | 4/1954 | Werner | 43/44.83 |
| 3,717,907 | 2/1973 | Klein | 24/129 R |

FOREIGN PATENTS OR APPLICATIONS

| 1,284 | 3/1879 | Great Britain | 24/123 |
|---|---|---|---|
| 439,189 | 6/1912 | France | 24/126 |

Primary Examiner—Paul R. Gilliam
Assistant Examiner—Kenneth J. Dorner
Attorney, Agent, or Firm—Van Valkenburgh, Lowe & Law

[57] ABSTRACT

A small, cigar-shaped line connector is affixed to the butt of a leader so that a line, such as a fly line, may be secured to this connector. An axial passageway opens at one end of the connector to receive the butt end of the leader, and this leader end is affixed therein. An axial passageway opens at the other end of the connector and extends to a transverse slot in the side of the connector. To secure the line thereto, the line is threaded through the passageway to permit its end to project from the slot. The end of the line is then knotted and the knot is pulled back into the slot to complete the connection. The leader is affixed to the connector in various ways. A preferred mode of attachment is to provide a leader passageway which extends to the transverse slot. The diameter of the passageway is increased adjacent to the slot to form a socket. Then the leader end is threaded through the passageway and extended from the slot. It is then knotted and the knot is pulled back into the socket to lock the two components together.

11 Claims, 11 Drawing Figures

LEADER WITH A LINE CONNECTOR

This application is a continuation-in-part of my application for a "Leader Connector," which was filed Mar. 25, 1971, Ser. No. 128,015 now U.S. Pat. No. 3,717,907. The present invention includes subject matter disclosed but not claimed in that application, as well as additional subject matter.

The present invention relates to connectors for fishing tackle, and more particularly to a connector at the butt of a leader for connecting the leader with a line, such as a fly line.

Accordingly, the invention will be hereinafter called a "leader with a line connector" and sometimes a "line-connector."

The leader with a line connector, when constructed according to the present invention, finds special utility in conjunction with tapered monofilament leaders for fly lines, and the invention is best exemplified by describing the line-connector as a connector on a tapered leader for connection with a fly line. Such is not to be construed as a limitation, however, for the line-connector will have other applications.

Fly fishing involves casting a line a substantial distance over a body of water wherein only the weight of the line is used to effect the cast. To be proficient in the art of fly casting, a fisherman must acquire a high degree of skill and must use good equipment. A skilled fly caster will use a tapered line and tapered leader at the end of this line. The leader may be as much as 9 feet long, or longer, and may taper from a diameter which makes it almost as heavy as the weight of the line at its connection, to a very small tippet at the end of the leader. In a smooth, effective cast, the line and leader will unroll about an outwardly moving loop to their full reach. The taper is essential to maintain the momentum of the moving loop. It is especially desirable that there be no kinks in the line or in the leader which would disrupt this moving loop, especially at the point where the leader is tied to the line.

The use of monofilament tapered leaders has improved the art of fly fishing to a substantial degree. These leaders, which are usually manufactured of nylon, will taper from a comparatively heavy butt to a very fine, small diameter end where an artificial fly may be tied. The taper of the leader permits the leader itself to cooperate with the tapered fly line providing that the tapered leader connects with the line in an uninterrupted manner. Any disruptions in the alignment of the fly line or of the leader, such as a knot or a knotted connection, will hamper and render more difficult the casting of the line. Thus, it is important that a leader be properly tied to a line so the two are axially aligned at the connection. The tie must be with a selected knot to avoid kinks and/or slip-separation of the leader from the line. Many leaders are provided with end loops to permit a novice to tie a non-slip knot, but this defeats the purpose of securing perfect alignment. An expert fly fisherman will usually cut the end loop from the leader and tie the leader onto the line according to his own system. This may be very time-consuming. However, while special knots in a line to secure a leader thereto are not entirely satisfactory, metal clips and swivel connectors, which are commonly used in other types of fishing gear, are even less desirable, for they are usually too heavy and awkward to use with a fly line. Also, such connectors may prevent the leader from being pulled into the guide rings of the fishing rod as is often done when using a fly line with a long leader.

My former application hereinabove referred to discloses a leader connector formed as a very small member which is shaped somewhat like a cigar. This connector has longitudinal passages within it, from each end, which extend to a transverse side opening near the center of the connector, and which will be hereinafter referred to as a slot. In that construction, the end of the line and the end of the leader are threaded into the passageway from opposite ends of the connector. They are then extended from opposite sides of the slot, knotted, and the knots are pulled back into the slot to complete the connection.

It was discovered that these small, simple, low cost connectors do maintain a continuity of alignment between a leader and the fly line to a surprising degree, and they have quickly become popular with fishermen. However, it appears expedient to provide a construction wherein the leader is securely affixed to the connector as a unitary combination, such as in the manner shown at FIG. 9 of my former application as an improvement and further refinement.

The present invention was conceived and developed with the above considerations in view, and the invention comprises, in essence, a connector similar to the unit above described, and a leader whose butt end is affixed to one end of this connector to form a unitary article. A fly line is connected to the opposite end of the connector by threading it through a passageway therein and extending it from a transverse slot in the body of the connector. A knot is tied into the end of the line, and the line is then pulled to pull the knot back into the slot to complete the connection.

It follows that an object of the invention is to provide a novel and an improved leader with a line-connector, which may be connected to a fly line in a manner which assures a perfect, straight, unkinked alignment of the line and leader at their interconnection.

Another object of the invention is to provide a novel and improved leader with a line-connector, wherein the line-connector is so small and compact that it will not interfere with the casting of the fly line and which can easily pass thorugh the guide rings of the fishing rod when it is desired to pull the leader into the fishing rod.

Another object of the invention is to provide a novel and an improved leader having a line-connector, which may be quickly connected to a line, such as a fly line, by tying only a simple knot at the end of the line without any danger of the knot slipping to separate the leader from the line.

Another object of the invention is to provide a novel and improved mode for securely holding the butt of a leader in a line-connector.

Another object of the invention is to provide a novel and improved line-connector for a leader which is a small, lightweight unit and which can easily be made to float on water when used in connection with dry fly fishing.

Yet other objects of the invention are to provide a novel and improved line-connector and leader combination which is a simple, low cost, neat appearing item, capable of being manufactured in an economical manner by various methods, including both manual and machine operations.

With the foregoing and other objects in view, the present invention comprises certain constructions, combinations and arrangements of parts and elements as hereinafter described, defined in the appended claims and illustrated in preferred embodiment in the accompanying drawing, in which:

FIG. 11 is a longitudinal sectional view similar to the showing at FIG. 4 with a narrowed slot structure and illustrating in broken lines the flexing of the connector when a leader knot is forced into place.

Figure 1:
FIG. 1 is a plan view showing the improved leader line-connector combination secured to the end of a fly line.

Referring more particularly to the drawing, the invention resides in an improved combination of a leader L and a connector head H as a unitary structure, with the two components being permanently secured together. In use, the leader-connector combination is attached to a line, such as a fly line F, as indicated at FIG. 1. When used for fly fishing, the leader L is a tapered monofilament nylon strand. However, other types of leaders can be used in the present invention, for the invention is concerned only with the butt end of the leader L which is attached to the connector.

The connector head H is formed as a small, cylindrical body which is somewhat cigar-shaped. An axial passageway extends into each end of this connector H, with the passageway at one end thereof being proportioned to receive the butt end of a leader L and with the passageway at the other end thereof being proportioned to receive the end of the line F. The connector H also includes a transverse slot near its center, which intercepts the passageway for the fly line F, and which may intercept the passageway for the leader, depending upon the manner in which the connector head H is attached to the leader.

Figure 6:
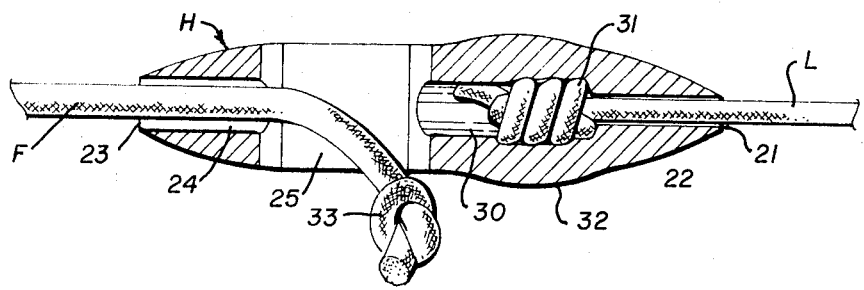
FIG. 6 is a longitudinal sectional view similar to FIG. 5, but with the leader end butt interlocked into the connector and with the end of a fly line being threaded into the connector and projected from the slot thereof preliminary to fastening the line in place.

The preferred mode of forming the leader-connector combination is by interlocking the butt of the leader into the connector, as in the manner shown at FIG. 6. In this arrangement, the connector head H is formed as a small, longitudinal, cigar-shaped body 20 of nylon or a similar strong, resilient material. The body has a diameter of approximately 0.10 inch, which is approximately three times the diameter of the fly line F and approximately four times the diameter of the leader butt L. A leader-connective end 21 of the body has a longitudinal, axial passageway 22 extending into the body, and the diameter of this passageway is slightly greater than the diameter of the butt of the leader L for a free-sliding fit thereunto. A line-connective end 23, at the opposite end of the body has a longitudinal, axial passageway 24 extending into the body, and the diameter of this passageway is slightly greater than the diameter of the fly line F for a free-sliding fit thereinto.

These passageways 22 and 24 are on a common axial alignment and are intercepted by a transverse slot 25, which is illustrated as being a longitudinally elongated opening through the body 20 and positioned from the center of the body towards the line-connective end 23 to provide a longer reach for the leader passageway 22 than for the line passageway 24. This permits a socket to be formed within the leader passageway, as hereinafter described. The function of the slot 25 is to receive the knotted end of a fly line threaded through the passageway 24, as will be described. A suitable slot form, as illustrated, provides for an angular notch 26 at each end of the elongated slot which gives the slot an appearance of a flattened hexagon. However, the form and proportions of the slot are optional. The width of the slot 25 is preferably slightly greater than the diameter of the line passageway 24 to better receive a knot tied into a line threaded through that passageway, although this, again, is optional, for it is contemplated that the nylon body will have sufficient resilience and flexibility to yield somewhat, along with the yielding of a knotted line, to receive and hold the line knot with a tight, snug fit.

The axial leader passageway 22, having a diameter only slightly greater than the diameter of the butt of the leader L, includes a socket 30 within the body 20. The diameter of this socket is approximately one-third to one-half greater than the diameter of the passageway 22, and as a practical matter, this socket 30 may be a continuation of the line passageway 24 which enters the body from the opposite, line-connective end 23. The leader is secured into position within its passageway 22 by threading the butt end of the leader through this passageway so that the end will extend from the side slot 25. A knot 31 is tied into the end of this leader. Because the leader is a smooth nylon, silk or gut strand, it will be very slippery when wet. Accordingly, the knot 31 is preferably more than a simple overhand knot, and the same is tied as a clinch knot or a barrel knot or the like, where several loops of the leader are wrapped about itself to produce a comparatively large knot at the end of the leader as illustrated. Such knots as clinch knots are well known to skilled fisherman and to manufacturers of fishing tackle and hence need not be described in detail.

Figure 5:
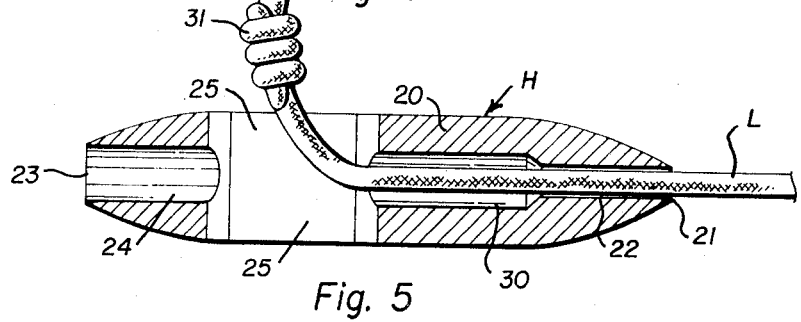
FIG. 5 is a longitudinal sectional view similar to FIG. 3, but showing the butt of the leader threaded into the connector and knotted at its end preliminary to securely interlocking the two components.

To complete the interlocking connection between the leader and the connector head, the knot 31 is simply pulled into the slot 25 of the connector and thence into the socket 30, as illustrated at FIGS. 5 and 6. It is to be emphasized that the diameter of this knot 31 will be greater than the diameter of the socket 30, and the knot must be forcibly pulled into the socket by stretching and distorting the connector body 20, and, at the same time compressing the knot 31. Preferably, the fit is so tight that a substantial pull of a leader will be required before the knot will move into the socket, and because the connector is made of a resilient material, such as nylon, the knot 31 will move into the socket 30 with a distinct, audible snap. Once this knot 31 is embedded into the socket 30, the pressure of the knot will distort and expand the connector, as indicated at 32. This distortion, as shown, is exaggerated and actually it may be quite small. Nevertheless, the knot will be so tightly embraced by the socket 30 that it will be very difficult to separate the connector from the leader.

Figure 2:
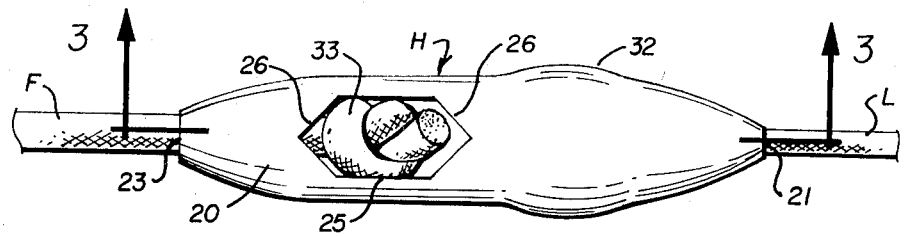
FIG. 2 is a plan view of the line-connector, a fragment of the leader secured thereto, and a short portion of the end of a line, showing essentially the same combination shown at FIG. 1, but on a greatly enlarged scale.
Figure 3:
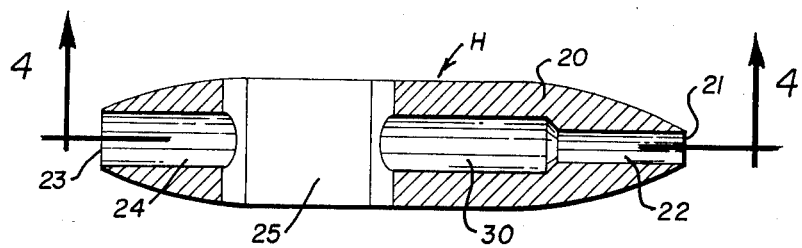
FIG. 3 is a longitudinal sectional view as taken from the indicated line 3—3 at FIG. 2, but showing the connector per se, with the leader removed.
Figure 4:
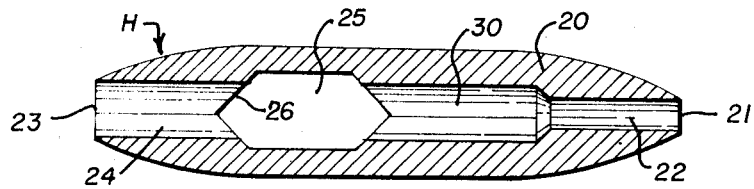
FIG. 4 is a longitudinal sectional view as taken from the indicated line 4—4 at FIG. 3.

Once this connector is locked onto the leader, the leader with the line connector is a completed, unitary product, and it may be merchandised as such. Thereafter, a fisherman may attach the connector to his fly line F when the leader is to be put into use. The attachment of the line to the connector, as heretofore described, is to thread the fly line into the line passageway 24 until the end of the line projects from the side slot. A simple overhand knot 33 may be tied in this fly line, as illustrated at FIG. 6, and the connection operation completed by pulling against the fly line and forcing the knot into the slot 25, as illustrated at FIG. 2.

Figure 11:
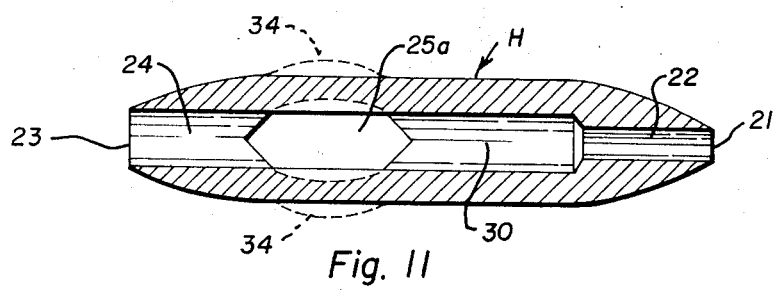
FIG. 11 is a longitudinal sectional view similar to the showing at FIG. 4 with a narrowed slot structure and illustrating

In the arrangement hereinabove set forth, the slot 25 was described as being slightly wider than the diameter of the line passageway 24. FIG. 11 shows a slightly modified construction of a connector head H in that the slot 25a has the same width as the diameter of the passageway 24. In this FIG. 11 arrangement, an overhand knot 33 in a line will fit very tightly in the slot 25a, and if the line L is a hard line having a diameter only slightly less than the diameter of the line passageway 24, considerable difficulty may be encountered in pushing the line knot 33 into the slot 25a. In some instances, this is a desirable result for when the line knot 33 is forcibly pushed into the narrow slot 25a, the nylon walls of the connector at each side of the slot will distort and flex outwardly, as at 34 to provide a very tight fit.

Several other modes of joining the leader L and the connector head H are possible, as exemplified by the modified embodiments of FIGS. 7 to 10.

Figure 7:
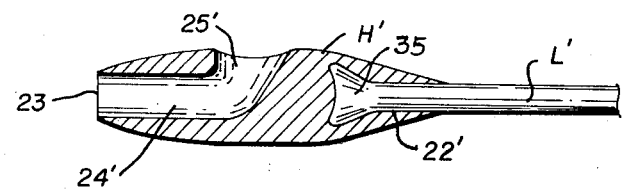
FIG. 7 is a longitudinal sectional view similar to FIG. 3, but showing, as a second embodiment of the invention, a construction wherein the end of the leader is permanently attached to the end of the connector, this view being identical to FIG. 9 of my copending application.

FIG. 7 shows the end of the leader L' embedded into the connector head H'. Thus, in this modified connector, only the line passageway 24' intercepts the slot 25', which is illustrated as an opening at only one side of the connector head H'. Thus, the fly line F will be attached to the connector head H', the same as heretofore described, that is, by threading it through its passageway 24' so that the end of the line will extend from the side slot 25' to be knotted and again pulled back into the slot.

On the other hand, the end of the leader L' is fitted into the leader passageway 22' by an embedment such as would be formed if the connector head H' is molded upon the end of the leader. Preferably, an enlargement 35 is formed at the end of the leader L' to more securely anchor it within the connector.

The manner in which the butt of the leader L' is embedded into the connector can vary. The connector head H' may be formed by an injection molding process, with the butt end of the leader being positioned in a mold cavity to permit the same to fit into place with a tight, secure fit. Also, the passageway 22', wherein the leader L' is fitted, may be enlarged in a manner such as to impart to the plastic connector a property of memory. Then, the leader L' is placed into the passageway 22' and the connector shrunk upon the leader, as by heating. Such shrink-fit operations are well known and need not be further described.

Figure 8:
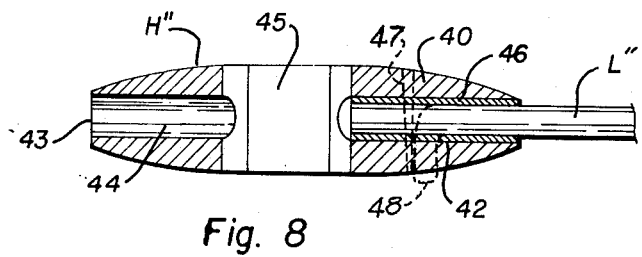
FIG. 8 is a longitudinal sectional view similar to FIG. 3, but showing another alternate embodiment of the connector wherein the leader is secured in place with adhesive.

The modified embodiment at FIG. 8 provides for a connector head H'', wherein the body 40 has a leader passageway 42 and a line passageway 44, both of which intercept a slot 45 near the center of the connector. In this construction, however, the leader L is secured in its passageway 42 by means of an adhesive layer 46 between the leader and the connector. This layer may be selected from known adhesive materials, depending upon the material used for the leader L'' and the connector head H''. For example, where the leader and connector head are of nylon, an aqueous phenol solution may be used. A 1:1 resorcinol-ethanol solution is also an effective adhesive or cement. Also, to obtain the same results, the leader may be fitted into the passageway 42 and welded as by electronic or supersonic methods.

If it is desired to eliminate or supplement the adhesive in a construction such as shown in FIG. 8, the leader may be wedged or pinned in place as by a transverse pin 47 shown in broken lines at FIG. 8. The pin may either penetrate the leader or may be used to offset the leader to any desired degree, even to the point of turning the end of the leader out the side of the connector as through a hole 48 indicated in broken lines at FIG. 8.

Figure 9:
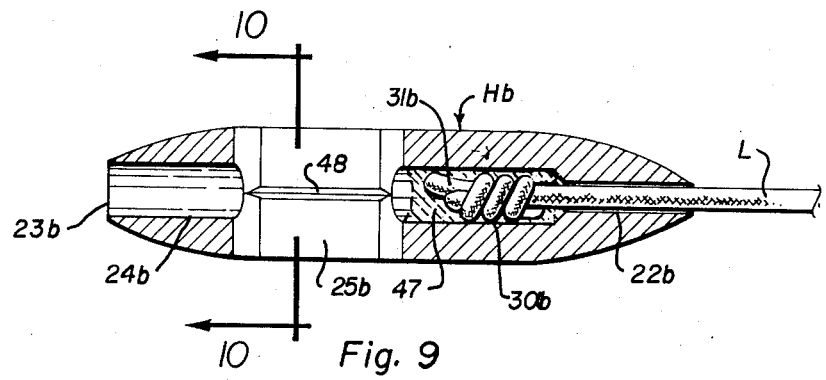
FIG. 9 is a longitudinal sectional view similar to the showing at FIG. 3, but illustrating a further embodiment wherein the knotted end of the leader is secured in a socket by an adhesive.
Figure 10:
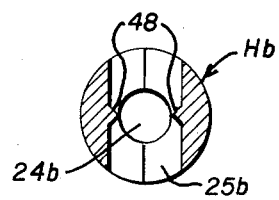
FIG. 10 is transverse sectional view as taken from the indicated line 10—10 at FIG. 9.

The connector head Hb shown at FIG. 9 provides a variation from the construction shown at FIGS. 2 to 6 in that socket 30b within the leader passage 22b is enlarged to the point where the leader knot 31b fits loosely within the socket 30b, and in this arrangement, it is desirable to use a filler resin 47, such as adhesive, to secure the knot in position within the socket as illustrated, since, otherwise, the leader may come loose from the connector. A further variation of structure is shown at FIGS. 9 and 10, wherein a small longitudinal ridge 48 extends across the center of each wall of the slot 25b. Such ridge 48 is desirable to assist in holding the knot 33 of a fly line in position within the slot 25b. The mode of forming this ridge is very simple. The connector is ordinarily manufactured of nylon or like material by a process of injection molding, wherein the passageways through the connector are formed by a core which extends from the line end 24b and completely through the unit, reducing in diameter in the leader passageway 22b. A two-piece mold having symmetrical cavities will embrace this core, and each cavity will include an insert for making half of the slot and for embracing the core. With such an arrangement, it is but a simple matter to modify the edges of the inserts to form the ridge 48.

In the constructions shown at FIGS. 7, 8 and 9, a wedge means may be used to spread the end of the leader or to secure the end of the leader very tightly in the socket, and to supplement or substitute the adhesive or filler heretofore described. Likewise, the socket 30 may be tapered to form a wedge-shaped structure to better grip a knot on the end of the leader or to better cooperate with an additional wedging means. A further expedient uses a wedge-shaped socket 30 and provides for an enlarged head at the butt of the leader, such as the enlargement 35 shown at FIG. 7.

I have now described my invention in considerable detail. It is obvious, however, that others skilled in the art can devise and build alternate and equivalent constructions which are nevertheless within the spirit and scope of the invention. Hence, I desire that my protection be limited not by the constructions described, but only by the proper scope of the appended claims.

I claim:

1. A connector in combination with the ends of two pliable lines with the diameter of the first line being approximately one-half greater than the diameter of the second line, such as a fly line and a leader, and comprising:

a tubular connecting member constructed of slightly stretchable material and having an axial passageway extending through it and a side opening intersecting the passageway;

said passageway at one end of the member forming a first passageway section which is slightly larger in cross section than the diameter of the said first line to receive the same;

said passageway at the other end of the member forming a second passageway section which has a cross section of a size sufficient to receive the second line;

said first passageway section extending to the side opening with the width of the side opening being at least as great as the diameter of the said first passageway section but not greatly exceeding that diameter, whereby the end of said first line may be threaded into the first passageway section, extended from the side opening, knotted and then pulled into the side opening with the knotted end being forced into the side opening by slight stretching of the connector and effecting a tight fit of the knotted end of said first line to the connector; and a locking means at the said second passageway section to securely lock the end of said second line into said second section.

2. In the organization defined in claim 1, wherein:
said locking means includes an increased diameter portion of said second passageway section within the connector defining a socket; and
a knot-like enlargement at the end of the said second line which fits into the aforesaid socket.

3. In the organization defined in claim 2, wherein:
said socket is formed by an extension of said first passageway section to extend this passageway from its end of the member to the side opening and a short distance beyond the side opening.

4. In the organization defined in claim 3, wherein said knot-like enlargement comprises:
a knot in the end of said second line and the diameter of the socket is such that the knot fits within the socket with a tight fit.

5. In the organization defined in claim 4, wherein:
said knot is a clinch knot.

6. In the organization defined in claim 1, wherein said locking means includes:
an adhesive within the said second passageway section securing the end of said second line therein.

7. In the organization defined in claim 1, wherein:
said locking means comprises walls of the connector tightly embracing the end of said second line.

8. In the organization defined in claim 1, wherein said locking means includes:
a weld between and joining the walls of said second passageway and the end of said second line.

9. In the organization defined in claim 1, wherein said locking means includes:
a wedging means.

10. In the organization defined in claim 1, wherein said locking means includes:
a pin means extending transversely through the connector.

11. A connector in combination with the ends of a first line and a second line which do not differ greatly in diameter, such as a fly line and a leader and comprising:

a tubular connecting member constructed of slightly stretchable material and having an axial passageway extending into it from each end thereof and a side opening near the center of the member;

said passageway at one end of the member forming a first passageway section which is slightly larger in cross section than the diameter of the said first line to receive the same;

said passageway at the other end of the member forming a second passageway section which has a cross section of a size sufficient to receive the second line;

said first passageway section extending to the side opening with the width of the side opening being at least as great as the diameter of the said first passageway section but not greatly exceeding that diameter, whereby the end of said first line may be threaded into the first passageway section, extended from the side opening, knotted and then pulled into the side opening with the knotted end being forced into the side opening by slight stretching of the connector and effecting a tight fit of the knotted end of said first line to the connector; and a locking means at the said second passageway section to securely lock the end of said second line into said second section.

* * * * *